May 31, 1966  L. B. CALLAHAN  3,253,748
PRESSURIZED DISPENSER VESSEL WITH HEAT EXCHANGE FEATURES
Filed Jan. 31, 1964 2 Sheets-Sheet 1
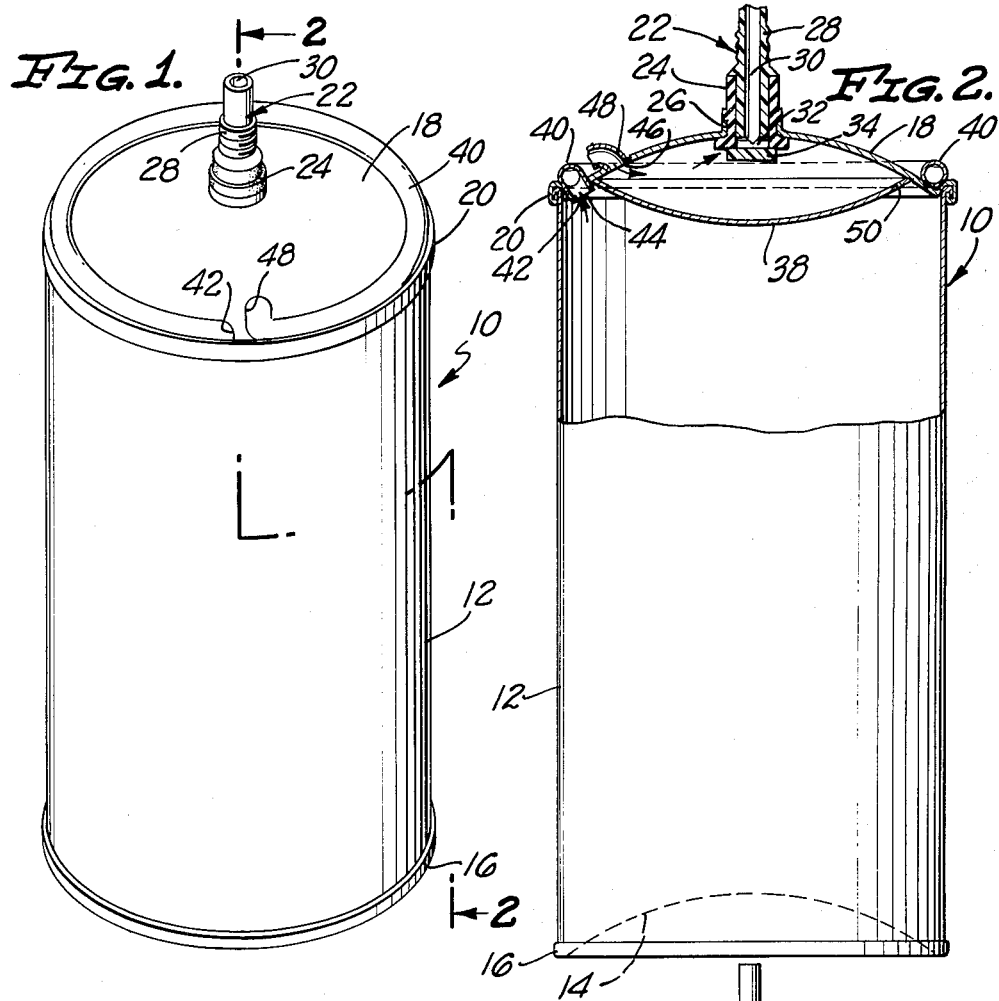
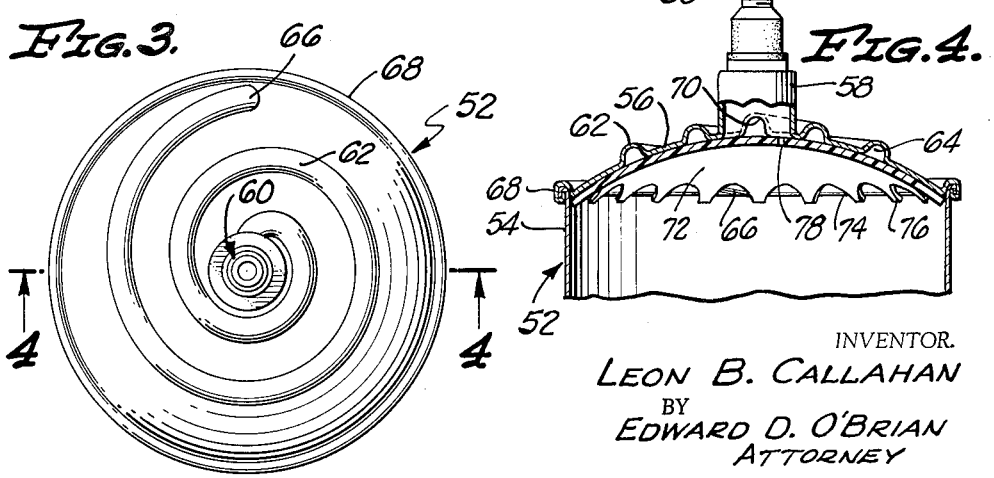
INVENTOR.
LEON B. CALLAHAN
BY EDWARD D. O'BRIAN
ATTORNEY

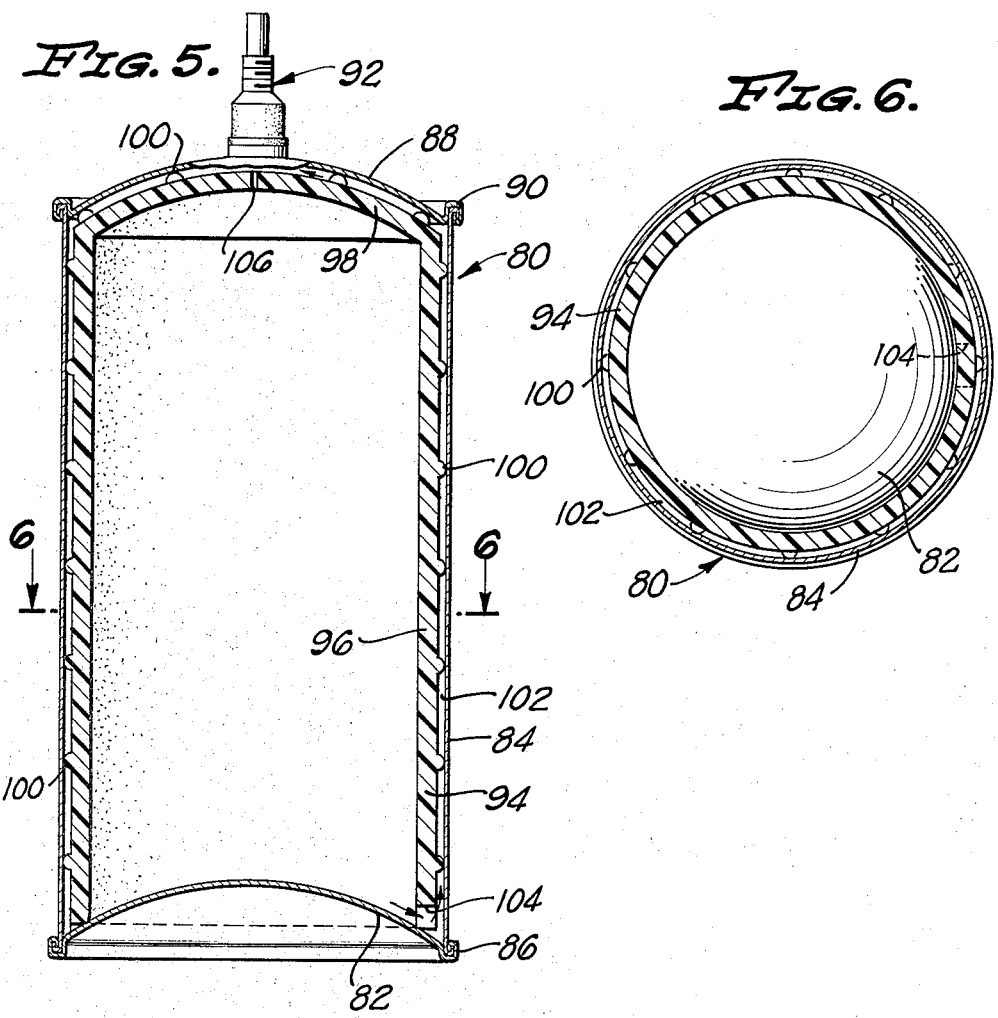

United States Patent Office 3,253,748
Patented May 31, 1966

3,253,748
PRESSURIZED DISPENSER VESSEL WITH
HEAT EXCHANGE FEATURES
Leon Bryant Callahan, Garden Grove, Calif.
(1794 E. 4th St., Santa Ana, Calif. 92705)
Filed Jan. 31, 1964, Ser. No. 341,596
1 Claim. (Cl. 222—146)

This invention is directed to a pressurized dispensing vessel fitted with integral heat exchange surfaces so that a limited amount of the material in the vessel may be heated.

Pressurized dispensing vessels are well known in the art. Freon and compressed air dispensed liquids, sprays and foams are commonly available on the commercial market. Such cans incorporate a structural, pressure containing vessel, usually with domed top and bottom and cylindrical sides. A dispensing valve at the top, arranged for manual actuation, permits manual control for the dispensing of contents. In some cases a dip tube extending from adjacent the bottom of the vessel to the outlet valve permits discharge of the bottom contents of the vessel. In other cases the vessel must be inverted to dispense the contents thereof. In each case of such pressurized vessels for dispensing fluids, the expanding propellent causes dispersion of the dispensed product. In some cases this results in foams and in some cases, where the material is a non-foaming liquid, in sprays.

No matter how the internal contents of the vessel is arranged, what propellent is used, or what material is dispensed, when one condition always applies. This is the condition that such vessels cannot be heated for fear of developing too high a pressure of the propellent with the consequent danger of bursting the vessel. In some cases it is very desirable that a portion of the contents being discharged is warm. Such warmth is desirable in dispensing such products as shaving cream, and in other cases it is desirable to add heat to overcome the cooling caused by expansion of the refrigerant upon discharge.

Accordingly it is an object of this invention to provide a pressurized dispensing vessel particularly adapted to permit heating of a small portion of the contents thereof, to eliminate the danger of over-pressure due to total heating, and to permit the discharge of a relatively small quantity of heated contents.

It is another object of this invention to provide a pressurized heating vessel having heat exchange surfaces in contact with a small portion of the vessel contents, and with the main portion of the can contents out of substantial thermal contact with the portion being heated.

It is another object of this invention to provide a heat exchange surface upon the outside of a pressurized dispensing vessel in such a manner that heat exchange with a small portion of the contents of the vessel is feasible for rapid heating thereof.

It is another object of this invention to provide a pressurized dispensing vessel for shave cream which permits the heating of a sufficient quantity of shave cream for a single application, without significant heating of the remainder of the contents of the vessel.

It is another object of this invention to provide heat exchange in the pressurized dispensing vessel of such nature that it is economic to produce and of sturdy trouble free characteristics.

Other objects and advantages of this invention will become apparent upon a study of the following portion of this specification, the claim and the drawings in which:

FIG. 1 is an isometric view of a pressurized dispensing vessel showing one embodiment of my invention as applied thereto, FIG. 2 is a section taken generally along the line 2—2 of FIG. 1;

FIG. 3 is a top plan view of another embodiment of a pressurized dispensing vessel carrying another embodiment of my invention;

FIG. 4 is a section taken along the line 4—4 of FIG. 3;

FIG. 5 is a side elevational section of a still further embodiment of a pressurized dispensing vessel embodying my invention; and FIG. 6 is a section taken along the line 6—6 of FIG. 5.

As an aid to understanding my invention it can be stated in essentially summary form that it is related to a pressurized dispensing vessel wherein fluid contents and a propellent are placed within the vessel and are dispensed by manual actuation of an exhaust valve secured thereto. Means is provided in this invention to provide a flow path for the material as it moves to the exhaust valve. This flow path is in heat exchange relation to the exterior of the vessel, and the amount of material within the flow path is small compared to that in the remainder of the vessel so that upon exposure of at least a portion of the exterior of the vessel to heat, the material in the flow path is heated without substantially heating the remainder of the contents of the vessel and without substantially raising the pressure therein. Of course there are plurality of structures which can be employed to accomplish this purpose, and in general it is preferable to segregate a small portion of fluid on its way to the exhaust valve. This can be acomplished by installing a diaphragm adjacent the head of the can, so such a portion is segregated adjacent the exhaust valve. It is preferable to improve the heat exchange to this segregated portion of fluid, and such can be accomplished by extending the surface at the head of the vessel by appropriately forming the head of the vessel or by applying an external heat exchange tube. Another structure which accomplishes the purpose designed above is an insert into the vessel spaced from the head which contains the outlet valve and spaced from the cylindrical walls of the vessel. This insert can be of molded polymer composition foam material to provide light weight, a minimum consumption of polymer composition material and of limited heat exchange. Such a device is usable in standard vessels, as presently known, and permits such standard pressurized dispensing vessels to be used for the heating of a small portion of the contents thereof without raising the temperature or the pressure of the main portion of the contents of the vessel to any significant degree.

This invention will be understood in greater detail by reference to the following portion of the specification wherein the drawings are described and referred to in detail. Shown in FIGS. 1 and 2 is a standard pressurized dispensing vessel 10 modified in accordance with this invention. The vessel 10 comprises cylindrical vessel walls 12 which are formed by standard can making procedures. Such walls are normally printed in flat sheet form, cut to size, rolled and soldered to form an open ended cylinder. This wall 12 is then provided with domed ends. Bottom end 14 is domed upwardly and is sealed to the cylindrical wall 12 by means of a standard rolled edge 16. Similarly top end 18 is domed upwardly and is sealed to the cylindrical wall 12 by means of a standard rolled top edge 20 to thus form the vessel.

Positioned at the center of the top end 18 is outlet valve 22. Outlet valve comprises a resilient insert bushing 24 positioned within outlet hole 26 in top end 18. Located within resilient insert bushing 24 is outlet valve 28 which has discharge hole 30 extending downwardly therethrough and terminating in a cross hole 32 just above bottom flange 34. Bottom flange 34 normally engages with the lower end of resilient insert bushing 24 to form a seal. When manual force is applied to outlet valve 28, bushing 24 is distorted and the bottom flange 34 leaves its seat against the resilient bushing 24. This permits flow of vessel contents into cross hole 32 and thence out discharge hole 30. Release of manual pressure permits outlet 28 to reposition itself centrally within resilient bushing 24 so that bottom flange 34 again seats thereagainst to provide closure sealing.

In such a pressurized dispensing vessel, a plurality of different structures can be used to segregate a small portion of the contents thereof for the heating thereof. In FIGS. 1 and 2 such segregation is accomplished by installation of a wall 38 domed downwardly and secured to top end 18 away from the edges thereof that are formed into top rolled edge 20. To permit passage of material from the main portion of the can between bottom end 14 and wall 38, and to improve the heat exchange, tube 40 is connected to pass through top end 18 intermediate the outer edge of wall 38 and the top rolled edge 20 through perforation 42 in top end 18. Tube 40 is secured and sealed in perforation 42 and terminates at 44 within the main portion of the vessel defined by bottom 14, wall 12 and wall 38. Tube 40 is positioned in circular or spiral configuration outside of top end 18, and may make one or more turns closely positioned above the top end 18. The termination 46 of tube 40 opposite to the termination 44 passes through perforation 48 in top end 18 and is sealed therein. Perforation 48 is positioned inwardly, at a lesser radial distance, than perforation 42 so that it enters into the small volume defined by top 18 and wall 38.

It can be readily seen that in use the pressurized dispensing vessel of FIGS. 1 and 2 permits warming of a small quantity of the contents thereof. This is accomplished by running hot water over the top end 18 and tube 40. In view of the fact that the contents thereof are relatively limited, the contents rapidly heat without significant warming of the contents of the main portion of the vessel. Thence, when the material is used, the first portion to be discharged from outlet valve 22 is warm. The volume defined by top 18, wall 38 and tube 40 is proportioned so that the amount required for one normal use is contained therein so that all of the material discharged during one normal use is warmed by this action.

When the pressurized dispensing vessel 10 is used for the storage and dispensing of foamed products, such as shaving cream, occasionally volumes of propellent gas become separated from the foam. In order to permit discharge of such volumes back into the main body of the vessel 10, vent hole 50 is provided through the wall 38. Preferably vent 50 is located away from perforation 48 and outlet valve 22.

In the embodiment of this invention shown in FIGS. 3 and 4, the pressurized dispensing vessel 52 is similar in construction of that shown in FIGS. 1 and 2 insofar as the cylindrical wall 54 and the bottom closure are concerned. The top end 56 of vessel 52 is of especially stamped construction and carries a dome 58, drawn integrally therewith in which is positioned outlet valve 60. Outlet valve 60 is of identical construction to outlet valve 22, and accordingly is not shown in detail. Top 56 is provided with a drawn or stamped spiral heat exchange surface 62 which defines a volume 64 for the containment of material to be warmed. Spiral 62 begins at a larger radius at 66 adjacent rolled edge 68 where top 56 is joined to the cylindrical wall 54. From the beginning of the spiral at 66, the spiral 62 spirals inwardly to the dome 58 and is in open communication therewith at 70 where the spiral is terminated.

Positioned inside of pressure vessel 52 is wall 72 which is of such configuration as to lie against the generally domed interior of top end 56. Thus, wall 72 closes the open bottom of spiral 62 to form the volume 64. In order that the outer termination 66 of the spiral 62 is open to the main volume of vessel below wall 72, the outer edge of the wall 72 is provided with scallops 74 which define feet 76 therebetween. The feet 76 engaged on the interior of wall 54 to maintain wall 72 in position. Scallops 74 are of such dimension and such spacing that a portion of the spiral 62 adjacent its beginning termination 66 is open to the main body of vessel 52. Wall 72 is provided with vent hole 78 to permit the discharge of propellent gases.

In this embodiment a small volume of material, in pressure communication with the remainder of the contents of the vessel, is defined adjacent the top end thereof. The small volume can be readily and quickly warmed by inserting the top end of vessel 52 under hot running water. Thereupon a small portion of the contents of vessel 52 may be discharged in a warm state.

The choice of material which can be used for wall 72 is relatively wide. The only requirements are that the material be inert to the contents of vessel 52 and able to withstand a small pressure differential and a small amount of heating. It is noted however that it is desirable to have the wall 72 made of material with a relatively low heat transfer coefficient so that upon warming of the material in volume 64, the heat is not quickly lost to the contents of the main body of the can. Accordingly, a polymer composition material, of either foamed or solid construction is practical.

In FIGS. 5 and 6 a further embodiment of this invention is shown. In this embodiment a standard pressurized dispensing vessel 80 has the usual domed bottom 82 secured to the cylindrical side wall 84 by means of a rolled edge 86. The domed top 88 of vessel 80 is secured to the side wall 84 by means of another conventional rolled edge 90, and outlet valve 92 is positioned in a suitable outlet hole in the top 88 similarly to the structure shown in FIG. 2. The structure makes up a standard commercially available vessel for the dispensing of fluids under pressure. Rather than change the structure of the basic vessel, this embodiment of this invention permits definition of a separate space of vessel contents to be warmed by the insertion of wall 94 into the vessel 80. Wall 94 is comprised of a cylindrical section 96 of an outside diameter just slightly smaller than the inside diameter of cylindrical wall 84, and a dome top 98 of such configuration as to be spaced slightly from top 88. Proper spacing is maintained by spacer projections 100 protruding from the outer surface thereof and in engagement with the interior of vessel 80 along the side walls 84 and top 88. The space 102 established by these spacer projections 100 is relatively small and is in open communication with outlet valve 92. In order to permit communication between the main volume of the vessel within the interior of wall 94 and space 102, the bottom of wall 94 is provided with one or more slots 104 cut in the bottom edge thereof. Furthermore wall 94 contains vent hole 106 to permit the escape of propellent gases, as was hereinbefore described.

It can be seen from this construction that the entire top 88 and wall 84 of pressure vessel 80 are available for heat exchange so that heat may be transmitted therethrough to heat the small volume of the contents of the pressure vessel which is located in space 102. Upon placing the vessel 80 under running hot water, heat is readily transferred through the metallic top and side wall of the vessel to warm the material in space 102. The material used in the production of wall 94 is of preferably low thermal conductivity so that the contents inside of the wall 94 remains relatively cool. After heating the material in space 102 for a short length of time, opening of the valve 92 permits the discharge of warmed material.

It is clear that the dispensing pressure vessels of FIGS. 1 and 3 are particularly adapted to discharge the contents of the vessels when such vessels are turned with the outlet valve downward. Such may be changed by placing an appropriate dip tube extending from the location where the pressure vessel material goes into the heat exchange zone to the bottom of the can. It is equally apparent that the vessel of FIG. 5 is particularly suited to the discharge of the contents thereof when the outlet valve 92 is in the upward position. Such may be changed by extending the slots 104 a greater distance toward the outlet valve 92.

It is clear from the above description that this invention is capable of numerous embodiments and modifications by changing the position and configuration of the wall defining the heat exchange zone and by various other modifications within the skill of the routine engineer without the use of the inventive faculty. Accordingly the scope of this invention is defined by the scope of the following claim.

I claim:

A vessel adapted for the storage and dispensing of material contained therein under pressure, said vessel comprising:

- a top, a bottom, side walls connecting said top and said bottom and a closure valve, said top, said bottom, said side walls and said closure defining a pressure tight vessel;
- a wall within said vessel dividing said vessel into a larger volume adapted to contain a larger quantity of material and a smaller volume adapted to contain a smaller volume of material, said top being domed away from the interior of said vessel and having the closure valve therein, said wall being domed toward the interior of said vessel and being secured to the interior of said top away from the juncture of said top with said side walls;
- a tube positioned exteriorly of said top, said tube opening at its first end into the larger volume within said vessel adjacent the juncture between said top and said side walls, said tube lying through substantially its entire length exterior of said top and adjacent the juncture between said top and said side walls, said tube being connected at its second end through said top into said smaller volume, said first and second tube ends passing through said top adjacent each other;
- a vent opening through said wall between the larger volume and the smaller volume, said vent opening being away from said first end and said second end of said tube;
- said vessel being arranged so that material flow from said larger volume of said vessel toward said closure valve successively passes through said first end of said tube, said tube exteriorly of said top, said second end of said tube into said smaller volume and thence through said closure valve so that said material in said tube and in said smaller volume may be readily heated by heat transfer through said tube and through said top without substantially raising the temperature of material in the larger volume in said vessel.

References Cited by the Examiner

UNITED STATES PATENTS

| | | | |
|---|---|---|---|
| 599,412 | 2/1898 | Wightman | 222—146 X |
| 1,923,363 | 8/1933 | Frederickson et al. | 222—146 X |
| 2,745,572 | 5/1956 | Talbott | 222—146 X |
| 2,873,351 | 2/1959 | Lannert | 222—146 X |
| 2,935,236 | 5/1960 | Mueller | 222—146 X |
| 3,081,764 | 3/1963 | Martin | 222—146 X |
| 3,171,572 | 3/1965 | Reich et al. | 239—135 X |
| 3,175,733 | 3/1965 | Lerner | 222—146 |

RAPHAEL M. LUPO, *Primary Examiner.*